J. CRANE.
Improvement in Fur Set Boxes.
No. 123,334.  Patented Feb. 6, 1872.
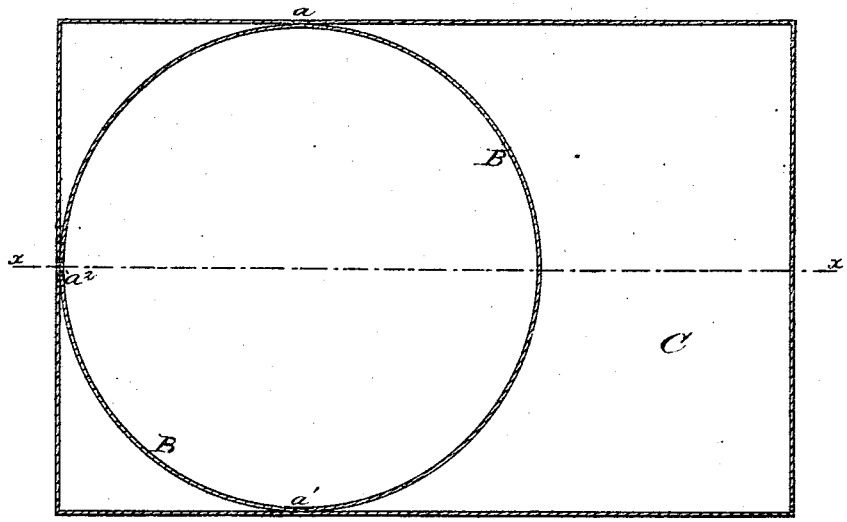
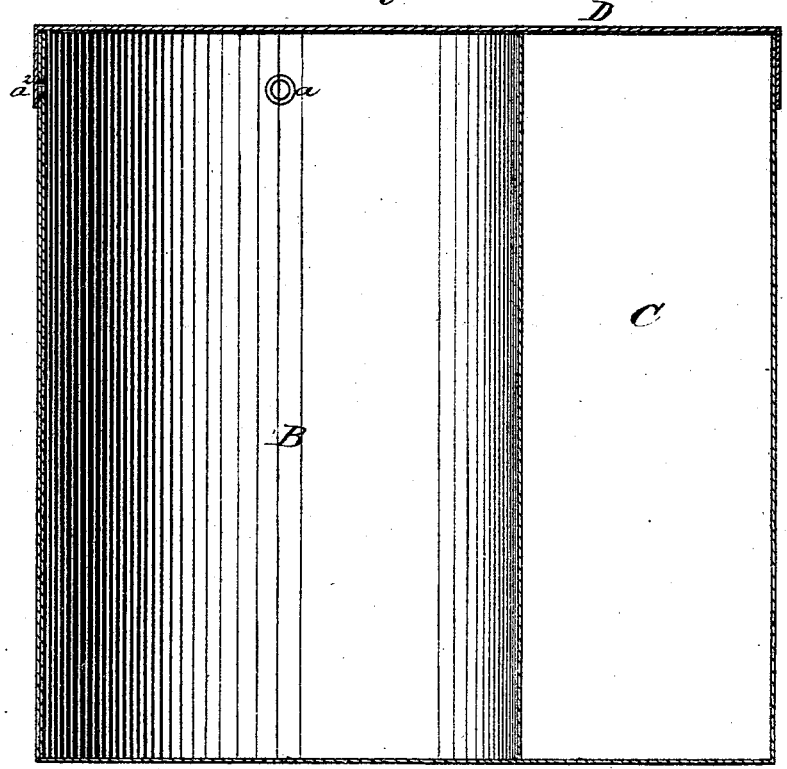
Witnesses:  Inventor:

UNITED STATES PATENT OFFICE.

JASON CRANE, OF BLOOMFIELD, NEW JERSEY.

IMPROVEMENT IN FUR-SET BOXES.

Specification forming part of Letters Patent No. 123,334, dated February 6, 1872.

*To all whom it may concern:*

Be it known that I, JASON CRANE, of Bloomfield, in the county of Essex and State of New Jersey, have invented a new and useful Improvement in Fur-Set Boxes; and I hereby declare the following to be a full, clear, and exact description of the same, reference being had to the accompanying drawing which forms a part of this specification, in which—

Figure 1 shows a cross-section, and Fig. 2, a longitudinal section in line $x$ $x$ of Fig. 1.

This invention is an improvement and modification of that described in the patent issued to me as assignee of James P. Jones, dated, October 26, 1869, and reissued March 28, 1871, No. 4,313. The object of my invention is to simplify and cheapen the box as made according to the invention of said Jones.

The following description will enable any one to make and use my invention.

The box A is of cubical form, made of paperboard or other suitable fabric. Within is a cylinder, B, the length and diameter of a lady's muff. This muff-cylinder rests upon the bottom of the box, and is the same in diameter as the width of the box, or nearly so. It is placed directly against one of the ends of the box, so as to be tangent to the two sides and one end of the box, to which it is firmly attached by means of the eyelets $a$ $a^1$ $a^2$, or other equivalent means. This leaves a space, C, between the cylinder B and the other end of the box A suitable for containing the collar-cuffs and any other articles required to make up a fur-set. On top is the cover D, secured by any of the usual or equivalent means.

The box made in this manner answers all the purposes of the box described in the Jones patent, and is both cheaper and more durable. There is no loss of space except the corners where the cylinder touches the end of the box. These, even, may be used for storing any small article or for containing any of the moth-repellent substances.

Having thus described my invention, what I claim, and desire to secure by Letters Patent, is—

A fur-set box of cubical form, containing muff-cylinder B, attached to one or more sides or the bottom, and leaving a collar-space, C, of the shape shown and described.

JASON CRANE.

Witnesses:
 T. C. BRECHT,
 JNO. D. PATTEN.